Oct. 1, 1963   C. G. DEWEY   3,105,920
PROTECTIVE DEVICE
Filed Sept. 15, 1961
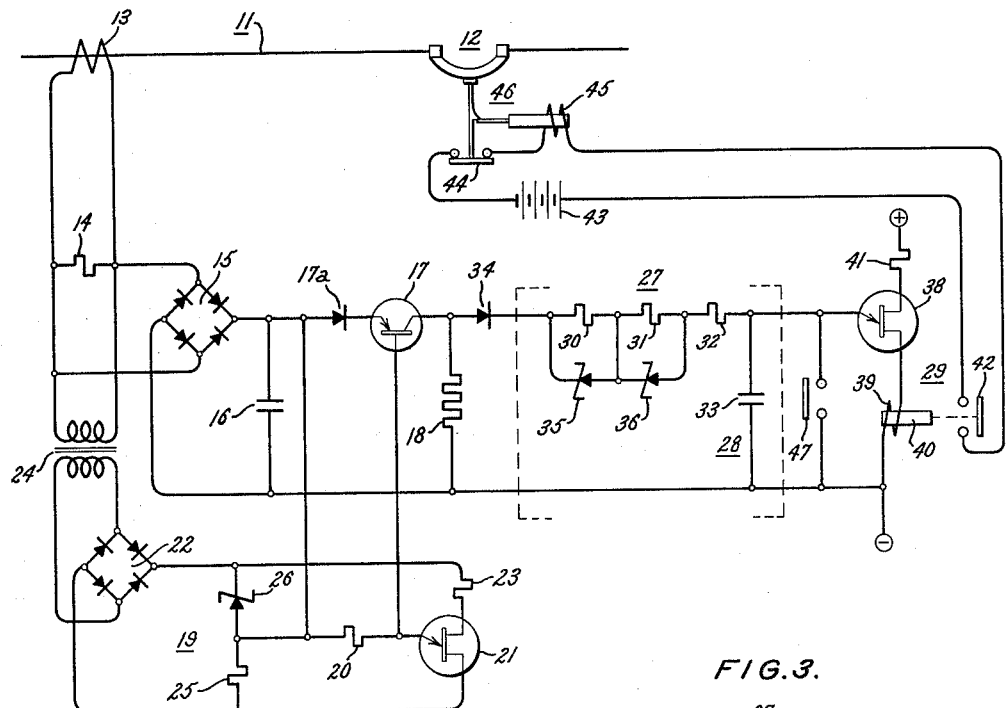
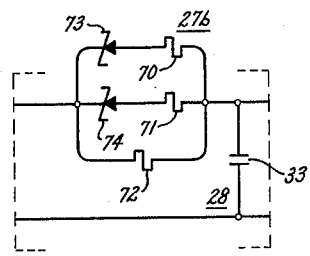
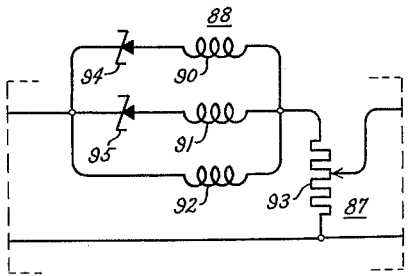
INVENTOR:
CLYDE G. DEWEY,
BY Albert S. Richardson Jr.
ATTORNEY.

United States Patent Office 3,105,920
Patented Oct. 1, 1963

3,105,920
PROTECTIVE DEVICE
Clyde G. Dewey, Philadelphia, Pa., assignor to General Electric Company, a corporation of New York
Filed Sept. 15, 1961, Ser. No. 138,476
17 Claims. (Cl. 317—36)

This invention relates to a protective device for an electric current circuit, and more particularly it relates to an overcurrent responsive device which utilizes electric energy storing means, including a D.-C. energized reactance element such as a capacitor, for delaying operation of the device in inverse relation to the degree of overcurrent in the protected circuit.

In the art of protecting electric lines or circuits it is common practice to use devices or relays designed to operate, in response to abnormal circuit conditions, with a time delay inversely related to the severity of the abnormality. For example, the overcurrent protective relay having an inverse-time-overcurrent operating characteristic is well known in the art, as is the time-overcurrent trip device for electric circuit breakers. In order to provide optimum circuit protection when fault or short-circuit conditions develop, the operating characteristic of such a device should closely parallel an $I^2t$-equals-a-constant relationship, that is, the operating time ($t$) of the protective device should vary inversely in proportion to approximately the square of the circuit current ($I$). Thus the operating characteristic will match the damage characteristic of the protected circuit, under fault conditions, when the threat of damage is proportional to the current value squared.

While inverse-time-overcurrent devices employing a mechanical or electromechanical construction to obtain the requisite time delay have had a long and successful history, such prior art devices do have some recognized drawbacks. The principal ones, perhaps, are the relatively large amount of input energy required for reliable operation and the inherent inertia of the movable armature or rotor of the device. Consequently, there is a trend in the art today to accomplish the same functional result by means of "static" circuitry, i.e., by appropriate combinations of semiconductors and other physically small, low-power solid-state components having no moving parts.

It has been the usual practice in such static arrangements to utilize an electric energy storing circuit including a D.-C. energized reactance element such as a capacitor, with the energization of this circuit being controlled by a D.-C. signal derived from the protected circuit. The capacitor serves to delay operation of the device according to the magnitude of the D.-C. signal; the device operates after a delay coinciding with the time the capacitor takes to charge to a predetermined critical voltage level. However, where the energy storing circuit has been supplied with D.-C. energization directly proportional to the magnitude of current in the protected circuit, the prior art arrangements of which I am presently aware have not paralleled to a satisfactory degree the desired $I^2t$ operating characteristic.

It is a general object of my invention to provide a relatively uncomplicated time delay protective device having improved energy storing means for enabling the device to approach, within practically acceptable limits, a true inverse-square operating characteristic.

Another object of the invention is the provision, for protecting an electric current circuit, of an economical yet reliable inverse-time-overcurrent responsive device in which the timing function is performed by means of a D.-C. energized electric energy storing circuit characterized by an alterable time constant which is dependent upon the magnitude of the D.-C. energization.

In carrying out my invention in one form, I provide means adapted to be coupled to an electric current circuit for deriving therefrom a D.-C. signal which is representative of a characteristic circuit quantity (such as current). This D.-C. signal controls the energization of electric energy storing means including two serially interconnected sections which comprise, respectively, resistance means and reactance means. In combination with the energy storing means a suitable level detector is provided to initiate an output control function when the reactance means has accumulated a predetermined amount of energy. The energy storing means is also provided with at least one non-linear impedance element which I connect in circuit with a porton of one of the aforesaid sections, whereby a parameter of said one section will change, as the impedance of the non-linear element changes, in response to a variation in an electric quantity of said one section from one predetermined level to another. As a result, the time constant of the energy storing means is altered in dependence upon the magnitude of the representative D.-C. signal, and the operating characteristic of an overcurrent protective device embodying this arrangement can approach the desired inverse-square time-current relationship discussed hereinbefore.

My invention will be better understood and its various objects and advantages will be more fully appreciated from the following description taken in conjunction with the accompanying drawings in which:

FIG. 1 is a schematic circuit diagram of an electric current circuit protected by a device constructed and arranged in accordance with one embodiment of my invention;

FIG. 2 is a graph of an inverse-time-overcurrent operating characteristic obtained by means of the particular scheme shown in FIG. 1; and FIGS. 3, 4 and 5 are schematic circuit diagrams of alternative arrangements of part of the protective device shown in FIG. 1, thereby illustrating other embodiments of my invention.

Referring now to FIG. 1, there is shown, schematically, a protective device associated with an alternating-current electric power circuit 11. The protected circuit 11 is intended to be connected to a suitable power source by means of a circuit breaker 12. While only a single-pole breaker 12 and a single circuit conductor 11 have been shown, it should be understood that what is represented in FIG. 1 may comprise but part of a complete 3-phase electric circuit and protective system therefor.

The illustrated protective device is designed to initiate a predetermined control function, such as initiating an opening operation of the circuit breaker 12 in order to disconnect the circuit 11 from its power source, in delayed response to the occurrence of an abnormal circuit condition. Toward this end, the protective device is arranged to be energized in accordance with a characteristic electric quantity of the circuit 11, and the value of this quantity, after it attains a predetermined "pickup" level, indicates both the occurrence and the severity of the abnormal condition to which the device responds. In the illustrated application of the protective device, this characteristic electric quantity is alternating current, and therefore the device is adapted to be inductively coupled by means of an instrument current transformer 13 to the protected circuit 11.

The occurrence of an overload condition, a short circuit or the like in the protected circuit 11 will cause circuit current to rise above its normal full-load value—the degree of overcurrent being dependent upon the severity of the abnormal condition. Operation of the device is desired in delayed response to such an overcurrent condition, with the amount of delay being inversely related to the degree of overcurrent. In other words, the operating time of the protective device is to be longer for small overcurrent values than at higher overcurrents. This result is obtained by using the current transformer 13 to supply input energy to the timing circuit which is described hereinafter.

As can be seen in FIG. 1, a suitable voltage dropping resistor 14 is connected in series with the secondary winding of the current transformer 13. Rectifying means, preferably comprising the illustrated full-wave bridge type rectifier 15, is connected across the dropping resistor 14 in order to provide a D.-C. signal (voltage) which will be used to control energization of the timing circuit of the protective device. A smoothing capacitor 16 of very small capacitance is connected across the D.-C. terminals of the rectifier 15, although this capacitor can be omitted if desired. A resistor 18 in series with a switching transistor 17 (further described below) are also connected across the D.-C. terminals of the rectifier.

The D.-C. voltage which is developed across the resistor 18, when the transistor 17 is "on," accurately represents the A.C. voltage across resistor 14 and hence is representative of the alternating current flowing in the protected circuit 11. It is apparent, therefore, that the voltage dropping resistor 14 in combination with the rectifier 15 comprise means for deriving from circuit 11 a D.-C. signal whose effective magnitude is dependent upon the value of the circuit current. As long as the current transformer 13 is performing linearly (not saturated), the effective magnitude of the D.-C. signal at resistor 18 will be directly proportional to the amount of circuit current flowing.

The above-mentioned switching transistor 17 is part of a gating means 19 which is provided for the purpose of permitting the protective device to operate only after current in the protected circuit 11 has first attained at least a predetermined pickup level. The transistor 17 normally is turned "off" (not conducting), whereby no significant voltage can develop across the resistor 18. Consequently, the timing circuit which is connected to this resistor is normally maintained in an inactive or disabled state. However, once an abnormal condition occurs in the protected circuit, as evidenced by circuit current rising above normal to a magnitude exceeding the aforesaid pickup level, the gating means 19 will quickly respond by turning on the switching transistor 17. As a result of the gating function, accurate and consistent operating times can be realized by the protective device regardless of variations in the history of circuit current immediately before pickup. Those skilled in the art will understand that this same function could be accomplished by means other than the particular gating means 19 which has been illustrated by way of example, and such particulars form no part of my invention.

As it is shown in FIG. 1, the switching transistor 17 comprises a conventional PNP transistor, and its conduction is controlled by the condition of a resistor 20 connected between the emitter and base electrode thereof. The resistor 20 in turn is connected in the emitter circuit of a semiconductor double-base diode 21 known in the art as a unijunction transistor. Base-one of the unijunction transistor 21 (the lower base electrode as viewed in FIG. 1) is connected to a negative D.-C. terminal of a full-wave bridge type rectifier 22, and base-two is connected to the positive D.C. terminal of the rectifier 22 by way of a resistor 23. The A.-C. terminals of the rectifier 22 are connected to the voltage dropping resistor 14, with a saturable isolating transformer 24 being interposed therebetween.

The rectifier 22 supplies to the interbase circuit of the unijunction transistor 21 a D.-C. input voltage which is directly proportional to the value of current in circuit 11 for current values up to at least the aforesaid pickup level. This input voltage also is applied to a resistor 25 and a breakdown diode 26 which are connected in series combination across the D.C. terminals of the rectifier. As can be seen in FIG. 1, the breakdown diode 26 is connected to the positive rectifier terminal and is poled in opposition thereto. This diode, which is a Zener diode or the like, has an abrupt reverse voltage breakdown characteristic which enables it to block the flow of reverse current as long as the reversely poled applied voltage is less than a predetermined critical breakdown level, at which point it freely permits reverse conduction while limiting the voltage drop thereacross to an essentially constant level equal to its breakdown voltage.

A connection is made from the positive terminal (the anode) of the breakdown diode 26, by way of resistor 20 to the emitter of the unijunction transistor 21, and consequently the emitter voltage of the unijunction transistor, prior to activation thereof, will be equal to the input voltage supplied by rectifier 22 minus the critical breakdown voltage of diode 26. So long as the potential of the unijunction transistor emitter is less positive with respect to base-one than a characteristic peak point emitter voltage, the unijunction transistor 21 is cut off or inactive, and only a small reverse leakage current flows through the emitter resistor 20. With the resistor 20 in this condition, the emitter-base junction of the switching transistor 17 is reverse biased; hence the transistor is off and the protective device cannot operate.

The peak point emitter voltage of a unijunction transistor is known to be dependent upon its interbase voltage, being a fixed fraction thereof. This fraction is termed the "intrinsic stand-off ratio," and in order to activate the unijunction transistor 21 its emitter voltage has to increase to a point which is equal to the product of its interbase voltage (the input voltage supplied by rectifier 22) and the intrinsic stand-off ratio. The emitter voltage, which is normally below this point, increases when the input voltage supplied by rectifier 22 increases. Due to the constant voltage characteristic of the breakdown diode 26, the emitter voltage progressively becomes a greater percentage of the interbase voltage, as the input voltage increases, until the stand-off ratio is reached, at which point the unijunction transistor 21 fires and its emitter current abruptly increases in a forward direction. This causes the emitter-base junction of the switching transistor 17 to be forward biased, thereby turning on the transistor and permitting the timing function to start in the protective device.

A silicon diode 17a is connected in the emitter circuit of the switching transistor 17 in order to prevent premature activation thereof. This diode is poled in agreement with the emitter-base junction of transistor 17, as can be seen in FIG. 1, and it inherently presents a relatively high impedance to the passage of a very small quantity of forward current. As the emitter voltage of the unijunction transistor 21 closely approaches its peak point, immediately prior to firing, the emitter current of this device characteristically begins increasing toward a small minimum value which is needed to fire the unijunction transistor. But because of the presence of the diode 17a, no appreciable part of this small amount of current can be shunted around the resistor 20 through the parallel emitter-base junction of the transistor 17, and consequently the switching transistor 17 permits virtually no current to pass until the unijnction transistor 21 has actually been fired.

The parameters of the gating means 19 are so selected that the above-described firing of the unijunction transistor 21 occurs in immediate response to the attainment of the pickup level of current in the protected circuit 11. Excessive current values subsequent to pickup are not reflected in the input voltage to the unijunction transistor 21 due to saturation of the isolating transformer 24, whereby the maximum input is suitably limited for safe operation of the unijunction transistor.

As soon as the switching transistor 17 is turned on, a D.-C. signal (voltage) representative of circuit current is developed at the resistor 18. As can be seen in FIG. 1, this signal is supplied to the timing circuit of the protective device. The timing circuit comprises electric energy storing means including two serially interconnected sections 27 and 28 disposed for energization in accordance with the magnitude of the voltage across resistor 18. One of the serially interconnected sections (section 27 in the first embodiment of my invention) comprises resistance means, and the other comprises reactance means. The function of the reactance means is to accumulate electric energy until a predetermined critical energy level is attained, whereupon a level detector 29 (described hereinafter), which is connected thereto, operates to produce an output control signal which initiates opening of the circuit breaker 12. The time required for this predetermined amount of energy to accumulate in the reactance means is dependent upon the time constant of the timing circuit and the magnitude of its D.-C. energization.

In the FIG. 1 embodiment of my invention, the resistance means 27 comprises a series combination of three resistance elements or resistors 30, 31 and 32, and the reactance means 28 comprises a normally discharged capacitance element or capacitor 33. Whenever the gating means 19 operates, electric energy starts to accumulate and is stored by the timing capacitor 33, and eventually the above-mentioned predetermined amount of energy will be accumulated therein. At that moment the capacitance element has been charged to a predetermined critical voltage level, and it is this particular value of capacitor voltage that triggers the illustrated level detector 29. An appropriately poled diode 34 is disposed between resistors 30 and 18 to block discharge of the timing capacitor 33 into its D.-C. energizing circuit.

The inherent time delay introduced by the timing circuit thus far described will vary as an inverse function of the D.-C. signal which controls its energization but is not inversely proportional to the second power of this signal. A protective device utilizing such a timing circuit would in fact have approximately an $It$-equals-a-constant operating characteristic over most of its operating range. In accordance with my invention, however, the timing circuit is uniquely arranged to have an alterable time constant dependent upon the magnitude of the D.-C. energization, and a satisfactorily close approximation to an $I^2t$ operating characteristic can then be obtained.

To accomplish this desired result, I connect non-linear impedance means in circuit with at least one portion of one of the serially-interconnected sections comprising the timing circuit. As is illustrated in the FIG. 1 embodiment of the invention, two non-linear impedance means 35 and 36 are disposed in series circuit relationship with section 28 and in parallel circuit relationship, respectively, with the resistance elements 30 and 31 of seciton 27. The non-linear impedance means 35 and 36 are both characterized by changeable impedance conditions—their impedance conditions being dependent upon the level of an electric quantity (e.g., voltage) of the section 27 and hence being controlled by the magnitude of the D.-C. energizing signal. More specifically, the effective impedance of each of the non-linear means 35 and 36 will be higher when the voltage across it has a relatively small magnitude than when the voltage has predetermined greater magnitude. With this arrangement, a parameter of the resistance section 27 is changed whenever the impedance of a non-linear element 35 or 36 changes, and the time constant of the timing circuit decreases as the value of the initially applied D.-C. signal increases. By appropriately selecting the various components of my timing circuit, as will be described in more detail hereinafter, a protective device having the desired operating characteristic is obtained.

Preferably the non-linear impedance means 35 and 36 comprise breakdown diodes similar to the breakdown diode 26 described hereinbefore. Each of these diodes is poled in opposition to the polarity of the D.-C. energization of the timing circuit, and its conducting status, with respect to the capacitor charging current, is dependent upon the magnitude of voltage across the resistance section 27. With only a relatively small magnitude of voltage across section 27, the reverse voltage impressed across each of the diodes 35 and 36 is less than their respective breakdown voltages, and each will be in a non-conducting or high-impedance state. Hence substantially all of the capacitor charging current must pass through all three of the serially combined resistors 30, 31 and 32, and the maximum RC time constant of the timing circuit is realized. When some greater magnitude of voltage is present across section 27 of the timing circuit, however, the voltage across at least one of the diodes will have reached its predetermined critical breakdown value, and the associated resistor is shunted by the now conducting diode connected in circuit therewith. The impedance of the conducting diode will decrease with increasing section voltage, and the diode prevents voltage across the shunted resistor from exceeding its constant breakdown value. Consequently, the effective resistance of the timing circuit is reduced, and its time constant is correspondingly shortened.

From the preceding description it will be apparent that the time constant of the particular timing circuit 27, 28 illustrated in FIG. 1 is dependent upon the magnitude of the energizing voltage developed at resistor 18. Whenever the gating means 19 operates in response to the occurrence of an overcurrent condition in the protective circuit 11, the whole voltage drop across resistor 18 will initially appear across only the resistance section 27 of the illustrated timing circuit.

Due to the provision of the non-linear impedance elements 35 and 36 in circuit, respectively, with different portions of section 27, the effective resistance of this section, and hence the time constant of the timing means, bears an inverse relationship to the magnitude of the energizing voltage which in turn depends upon the severity of the overcurrent condition. As a result, the time required for the reactance element 33 to accumulate the aforesaid critical amount of energy and hence trigger the level detector 29 is inversely proportional to an exponential function of the circuit current.

An operating characteristic actually obtained with the protective device shown in FIG. 1 has been graphically illustrated in FIG. 2. In FIG. 2, which is a conventional operating time vs. current graph, both coordinates are scaled logarithmically, and the amount of current in the protected circuit, in terms of multiples of pickup, is plotted along the abscissa. The curved line 37 in FIG. 2 defines the operating characteristic of the FIG. 1 device using a typical selection of components, and its approximation of a true inverse-square current-time relationship is apparent by comparing curve 37 to the straight line labeled $I^2t$. By using other component values an even closer approximation can be obtained if desired.

Before describing the particular level detector 29 and the remainder of the circuitry shown in FIG. 1, it is appropriate to consider now the manner in which the components of my timing circuit may be selected in order to obtain a given operating characteristic. The manner referred to comprises a series of steps which are outlined below:

(1) The operating characteristic ultimately desired is known, being dictated by the intended application of the protective device. In order to keep the actual operating characteristic within practically acceptable limits of the desired characteristic, it is assumed that the calculated current-time relationship of the device should not deviate by more than a predetermined percentage from the desired characteristic. For example, a maximum variation of calculated relationships, with respect to a characteristic curve desired, might be plus or minus five percent in operating time for any given current value.

(2) The range of current value through which the protective device must operate is also known, extending for example from pickup to 30 times pickup. This consideration among others leads to the selection of the value of the energizing signal at pickup. As an example, the D.-C. voltage developed across resistor 18 when current of pickup value is flowing in the protected circuit 11 has an effective magnitude of ten volts.

(3) In order to approach the desired operating characteristic during low-grade overcurrent conditions, when the resistance section 27 of the timing circuit is performing linearly and all three resistors 30–32 are active (because there is insufficient energization to cause either diode 35 or 36 to break down), the critical voltage level to which capacitor 33 must charge in order to trigger the level detector 29 is selected to be about 70 percent of the energizing voltage at pickup, or seven volts. A percentage greater than this is undesirable from the viewpoint of obtaining definite and consistent response by the protective device. The maximum time constant of the timing circuit can now be determined from the known equation $$t = xC\left(\log_e \frac{V_x}{V_x - v}\right)$$

where $t$ is the charging time (in seconds) required for the capacitor voltage to undergo a net increase of "$v$" volts, $C$ is the capacitance (in farads) of the capacitor 33, $x$ is the effective or active resistance (in ohms) in series with capacitor 33 during the period of time under consideration, $xC$ is the time constant of the timing circuit, and $V_x$ is the potential difference (in volts) across the effective resistance $x$ at the beginning of this charging period. Hence the maximum time constant is approximately equal to the quotient of 1.204 divided into a length of time which is within 5% of the time delay desired at pickup, as indicated from the curve of the desired operating characteristic.

(4) Having selected the critical capacitor voltage and the maximum time constant of the timing circuit, the time constant is next apportioned between the capacitance (C) of capacitor 33 and the total resistance (R ohms) of the serially combined resistors 30–32. Consideration is here given to three criteria:

(a) Since the resistance R is in the control circuit of the level detector 29, it must be sufficiently low to pass the leakage current of the level detector plus more than the leakage current of the timing capacitor 33 just prior to triggering of the detector. This condition is most limiting at pickup, when the amount of current flowing through resistors 30–32, at the specified moment, is only $$\frac{3}{R}$$

ampere.

(b) For reasons of space, reliability and economy, it is desirable to keep the value of C as low as possible.

(c) The use of components of standard ratings is preferred.

(5) Having chosen the value of the total resistance R, its apportionment among the three resistors 30, 31 and 32 and the breakdown voltages of diodes 35 and 36 can now be determined. At the highest multiple of pickup current within the given operating range of the protective device, it may be assumed that the breakdown diodes 35 and 36 are both initially in their low-impedance, conducting states (because the D.-C. energizing quantity is then equal to 30 times pickup, or 300 volts), and consequently the effective resistance of the timing circuit comprises only that of resistor 32 ($R_2$ ohms). The maximum time delay allowable under this condition is known from the desired operating characteristic. The value of the minimum time constant $R_2C$ is readily calculated, being approximately equal to the quotient of 0.024 divided into the aforesaid maximum allowable time delay, and from this the value of $R_2$ is found. This is not a rigorous calculation, since the number 0.024 has been derived from the equation of step 3 (above) assuming that $V_x$ were the same as the energizing quantity (300 volts), whereas the initial potential difference across the effective resistance $R_2$ for the condition being considered is actually 300 minus the sum of the breakdown voltages of the diodes 35 and 36. Because these breakdown voltages will be much less than 300 volts, however, the assumption is justified and a good first approximation of the desired value of $R_2$ is obtained in the indicated manner. On the other hand, in step 6 below it will be necessary to use for $V_x$ only that part of the applied voltage which actually appears across the resistor or resistors ($x$) which are not being shunted by a conducting breakdown diode at the beginning of each capacitor charging period calculated.

(6) The remaining amount of the total resistance R is divided between resistors 30 and 31. Their respective resistance values, and the breakdown voltage of diode 35 and 36, are best determined by trial and error, utilizing the equation set forth in step 3 and observing the limits suggested in step 1. For example, with neither diode conducting, the calculated operating characteristic deviates from minus to plus five percent of an ideal $I^2t$ relationship between pickup and about 1.3 times pickup. Consequently, a limiting level of energization (less than 13 volts) at which the first alteration in the time constant of the timing circuit should occur is established. If an $I^2t$ operating characteristic is to be approximated, the time constant at this point should be reduced by more than one-half, and hence the amount of active resistance remaining in circuit with the capacitor 33 after the first diode breaks down should be less than one-half the total resistance R. The next alteration in the time constant of the timing circuit is designed to be effected by the breakdown of the other diode at an appropriately higher level of voltage across the resistance section 27 of the timing circuit.

An illustrative set of component values selected by following the six steps outlined above is set forth, by way of example, in the following table.

| Component: | | Value |
|---|---|---|
| Capacitor 33 | farad | 0.0001 |
| Resistor 32 | ohms | 20,000 |
| Resistor 30 | do | 84,000 |
| Breakdown diode 35 | volts | 7.3 |
| Resistor 31 | ohms | 22,000 |
| Breakdown diode 36 | volts | 10.0 |

Returning now to the description of FIG. 1, the illustrated level detector 29 will be seen to comprise a double-base diode 38 similar to the unijunction transistor 21 described hereinbefore. Base-one of the unijunction transistor 38 is connected by way of the operating coil 39 of a tripping relay 40 to a negative terminal (the encircled minus symbol) of the suitable source of regulated D.-C. supply voltage (not shown). Base-two of the unijunction transistor 38 is connected by way of a resistor 41 to a positive terminal (the encircled plus symbol) of the supply voltage source. The tripping relay 40 has a normally open contact 42 which is serially connected in the tripping circuit of the circuit breaker 12. The tripping circuit comprises the contact 42, a battery 43, a normally open breaker auxiliary switch 44 and a trip coil 45 which effects actuation of the breaker latch 46 when energized.

The emitter of the unijunction transistor 38 is connected directly to the relatively positive terminal of the timing capacitor 33, and the negative terminal of capacitor 33 is connected to the negative supply voltage terminal as shown. Hence the emitter voltage of the unijunction transistor, prior to activation thereof, is equal to the voltage across the capacitor 33. The supply voltage and the parameters of the level detector 29 are so selected that the characteristic peak point emitter voltage of the unijunction transistor 38 corresponds to the aforesaid critical level of capacitor voltage (e.g. seven volts).

So long as the voltage across capacitor 33 is less than its critical level, the unijunction transistor 38 is cut off or inactive; consequently its interbase impedance is high, and only quiescent current flows through the operating coil 39 of the tripping relay. When the timing capacitor has accumulated a certain amount of energy, however, its voltage attains the critical peak point emitter voltage and the unijunction transistor 38 is activated or fired, thereby abruptly changing to a relatively low-impedance state. This results in an appreciable increase in current flowing through the operating coil 39, and the tripping relay 40 responds by closing its normally open contact 42 and hence completing the tripping circuit of the circuit breaker 12. At the same time the capacitor 33 is quickly discharged through a path including the then low-impedance emitter-base-one junction of the unijunction transistor 38.

In order to ensure complete discharge of the timing capacitor 33, there is connected thereacross a switch contact 47 shown open, this contact being closed (by suitable actuating means not shown) in response to operation of the protective device. By actuating the switch contact 47 in accordance with the teachings of a copending patent application S.N. 74,325, filed on December 7, 1960, for E. J. Casey and J. C. Sofianek, and assigned to the assignee of the present invention, it may also be used in lieu of the illustrated gating means 19 to perform the gating function.

From the foregoing detail description of the circuitry and operation of the various parts of the protective device which is depicted in FIG. 1, the overall mode of operation may now be readily followed. Normally the switching transistor 17 is off and the timing capacitor 33 is in a discharged state. When the protected circuit 11 is subject to an abnormality which causes a sudden increase in circuit current to an overcurrent value which is greater than pickup, the gating means 19 instantaneously responds by turning on the switching transistor 17, whereby a D.-C. signal of a magnitude which is dependent upon the amount of overcurrent is developed at the resistor 18. The timing circuit 27, 28 is arranged for energization in accordance with the magnitude of the D.-C. signal, and energy is accumulated at a rate dependent upon this magnitude.

Since the timing capacitor 33 had previously been discharged, the resistance section 27 of the timing circuit initially absorbs all of the energizing signal, and consequently the effective resistance in series with the timing capacitor also depends upon the degree of overcurrent. For very mild overcurrent conditions, all three resistors 30, 31 and 32 contribute to the total resistance, a maximum time constant is obtained, and the capacitor 33 charges at a very slow rate. For very severe overcurrent conditions, the initial potential difference at each of the resistors 30 and 31 is equal to the breakdown voltage of the respective shunting diodes 35 and 36, resistor 32 provides the only resistance effectively in series with capacitor 33, a minimum time constant is thus obtained, and the timing capacitor charges at an exceptionally fast rate.

The timing capacitor continues charging until its predetermined critical level of accumulated energy is attained, the elapsed time being inversely related to an exponential function of the amount of energization supplied to the timing circuit. The emitter voltage of the unijunction transistor 38 has now been raised to the critical peak or firing point, and the level detector 29 is triggered thereby activating the tripping relay 40 which initiates opening of the circuit breaker 12.

By utilizing a pair of breakdown diodes 35 and 36 in the timing circuit of the protective device described hereinabove, I can obtain operating times which vary inversely in accordance with approximately the second power of the circuit current over a wide range of current values. If the application of the protective device were to permit a relatively large tolerance in its operating characteristic, compared to a true $I^2t$ relationship, only a single breakdown diode need be used. On the other hand, where a relatively high degree of precision is demanded in the shape of the curve of the operating characteristic, a string of three or more breakdown diodes could be used.

The last-mentioned alternative is illustrated in FIG. 3 of the drawings. Only the timing circuit of the protective device has been shown in FIG. 3; the associated circuitry outside of the broken lines can otherwise be the same as is shown in FIG. 1. The timing circuit of the FIG. 3 embodiment of my invention includes two serially interconnected sections 27a and 28, with sections 27a comprising a series combination of six elements of like kind, namely resistors 50–55. Although these elements are all of like kind (resistors), they do not necessarily have the same values of resistance. The section 28 comprises a capacitor 33 as before. Five breakdown diodes 56–60 disposed in series with capacitor 33 are connected, respectively, in parallel circuit relationship with the resistors 50–54 of section 27a. This arrangement operates in essentially the same fashion as the timing circuit shown in FIG. 1 and described hereinbefore, and by appropriately selecting the parameters of the individual components of the resistance section 27a, an even closer correspondence between the actual and the desired operating characteristics can be obtained.

FIG. 4 illustrates another alternative for the timing circuit of FIG. 1. In this alternative embodiment of my invention the resistance section 27b of the timing circuit comprises a parallel combination of three resistors 70, 71 and 72. Each of the resistors 70 and 71 has connected in series circuit relationship therewith a different breakdown diode, 73 and 74 respectively. The diode 73 permits conduction by the resistor 70 only when the voltage across the resistor 70 and the diode 73 in circuit therewith is greater than the predetermined critical breakdown level of that diode. Similarly the diode 74 permits conduction by resistor 71 only when the voltage across the resistance section 27b is greater than the predetermined critical breakdown level of diode 74. When the input voltage initially applied to the timing circuit of FIG. 4 is less than the breakdown voltage of either diode 73 or 74, only the resistor 72 is effectively in series with the timing capacitor 33, and the circuit has its maximum time constant. At high levels of input, however, the initial voltage across the resistance section 27b will be greater than the breakdown voltages of both diodes, and the effective resistance in series with capacitor 33 is that of the parallel combination of all three resistors 70, 71 and 72, whereby a minimum time constant is obtained. Thus it is apparent that the operation of the timing circuit shown in FIG. 4 is essentially the same as that of the timing circuit of FIG. 1.

In FIG. 5 still another alternative of the FIG. 1 timing circuit is illustrated. In this case the timing circuit comprises electrical energy storing means including two serially interconnected sections 87 and 88. The section 87 comprises resistance means, specifically a potentiometer 93. The section 88 comprises reactance means which, as can be seen in FIG. 5, is actually a parallel combination of three reactance elements of like kind, namely inductors 90, 91 and 92 (not necessarily of like values of inductance). Two breakdown diodes 94 and 95 are disposed, respectively, in series circuit relationship with the inductors 90 and 91. This arrangement is analogous to that shown in FIG. 4. The inductors 90–92 are normally deenergized, and when an energizing signal is supplied to the circuit it determines the initial voltage drop across the reactance section 88. At low levels of energization, then, only inductor 92 is in circuit with the resistance element 93, and the time constant $$\left(\frac{L}{R}\right)$$

of the timing circuit is relatively long. When the input signal is large, the initial voltage across section 88 will be greater than the breakdown voltages of both the diodes 94 and 95, all three inductors 90, 91 and 92 are effectively connected in parallel, and a minimum time constant is obtained. As energy is accumulated by the inductor 92, current rises in the series connected resistance section 87, and when a predetermined amount of energy has been accumulated the voltage drop across the tapped portion of the resistance element attains the critical level required to trigger the level detector 29 which is connected thereto.

The alternative embodiments of the timing circuit illustrated in FIGS. 1, 3, 4 and 5 have certain basic features in common. In each case nonlinear impedance means (breakdown diodes) are connected in circuit with some portion of the serially interconnected sections forming the timing circuit, whereby the time constant of the circuit is altered as an inverse function of the magnitude of energization. The arrangement is such that the time constant is reduced at high levels of energization, and accordingly the length of time which the energy storing means takes to accumulate a predetermined level of energization can be made to vary inversely as an exponential function of the magnitude of energizing quantity.

While I have shown and described several forms of my invention by way of illustration, other modifications will surely occur to those skilled in the art. It is contemplated, therefore, by the claims which conclude this specification to cover all such modifications as fall within the true spirit and scope of the invention.

What I claim as new and desire to secure by Letters Patent of the United States is:

1. Means for initiating a predetermined control function in delayed response to the occurrence of an abnormal condition in an electric current circuit, comprising: means adapted to be coupled to the circuit for deriving therefrom a D.-C. signal having a magnitude dependent upon the value of a characteristic electric quantity of the circuit; electric energy storing means disposed to accumulate energy at a rate dependent upon the magnitude of said D.-C. signal when said magnitude exceeds a predetermined pickup level, said energy storing means including two serially interconnected sections comprising, respectively, a resistance element and a reactance element with one of the sections comprising at least two elements of like kind, said energy storing means also including a breakdown diode connected in circuit with a predetermined one of the elements of said one section for changing a parameter of said one section to alter the time constant of the energy storing means when voltage impressed across said diode reaches a predetermined critical level; and means connected to said energy storing means for initiating the predetermined control function in response to the accumulation of a predetermined amount of energy by the energy storing means.

2. In combination: means adapted to be coupled to an electric current circuit for deriving therefrom a D.-C. signal having a magnitude dependent upon the value of a characteristic electric quantity of the circuit; electric energy storing means disposed for energization under the control of said D.-C. signal, said energy storing means including two serially interconnected sections comprising, respectively, a resistance element and a reactance element with one of the sections comprising in series combination at least two elements of like kind, said energy storing means also including nonlinear impedance means connected in parallel circuit relationship with a predetermined one of the elements of said one section and in series circuit relationship with the other section, the effective impedance of said nonlinear means whenever voltage across said predetermined one element is less than a predetermined magnitude, being higher than when said voltage has said predetermined magnitude; and level detecting means connected to said energy storing means for initiating a predetermined control function in response to the accumulation of a predetermined amount of energy by the energy storing means.

3. The combination of claim 2 in which the serially combined elements of said one section of the energy storing means are resistors.

4. Overcurrent protective means for an electric current circuit, comprising: means adapted to be coupled to the circuit for deriving therefrom a D.-C. voltage representative of the circuit current; electric energy storing means disposed for energization by said D.-C. voltage, said energy storing means including two serially interconnected sections comprising, respectively, a capacitor and a series combination of at least two resistors, said energy storing means also including a voltage breakdown diode connected in parallel circuit relationship with a predetermined one of said resistors and in series circuit relationship with said capacitor, whereby the conducting status of said diode is dependent upon the magnitude of voltage across said series combination of resistors; and level detecting means connected to said capacitor for producing an output control signal in response to the charging of said capacitor to a predetermined voltage level.

5. The overcurrent means of claim 4 in which the voltage breakdown diode is a Zener diode.

6. In combination: means adapted to be coupled to an electric current circuit for deriving therefrom a D.-C. signal having a magnitude dependent upon the value of a characteristic electric quantity of the circuit; electric energy storing means disposed for energization under the control of said D.-C. signal, said energy storing means including two serially interconnected sections comprising, respectively, a resistance element and a reactance element with one of the sections comprising in parallel combination at least two elements of like kind, said energy storing means also including nonlinear impedance means connected in series circuit relationship with a predetermined one of the elements of said one section, the effective impedance of said nonlinear means being higher, whenever voltage across the predetermined element and the diode in circuit therewith is less than a predetermined magnitude, than when said voltage is greater than said predetermined magnitude; and means connected to said energy storing means for initiating a predetermined control function in response to the accumulation by said energy storing means of a predetermined amount of energy.

7. The combination of claim 6 in which the parallel elements of the one section of the energy storing means are resistors.

8. Overcurrent protective means for an electric current circuit, comprising: means adapted to be coupled to the circuit for deriving therefrom a D.-C. voltage representative of circuit current; electric energy storing means disposed for energization by said D.-C. voltage, said energy storing means including two serially interconnected sections comprising, respectively, a capacitor and a parallel combination of at least two resistors, said energy storing means also including a voltage breakdown diode conneted in series circuit relationship with a predetermined one of said resistors, whereby the conducting status of said diode is dependent upon the magnitude of voltage across said parallel combination of resistors; and a level detecting means connected to said capacitor for producing an output control signal in response to the capacitor being charged to a predetermined voltage level.

9. Protective means for an electric current circuit, comprising: means adapted to be coupled to the circuit for deriving therefrom a D.-C. signal having a magnitude dependent upon the value of a characteristic electric quantity of the circuit; electric energy storing means arranged for energization in accordance with the magnitude of said D.-C. signal whenever said magnitude exceeds a predetermined pickup level, said energy storing means including two serially interconnetced sections comprising, respectively, a resistance element and a reactance element with one of the sections comprising a plurality of elements of like kind, said energy storing means also including first and second nonlinear impedance means connected in circuit, respectively, with predetermined first and second ones of said plurality of elements of said one section, the impedance of said first and of said second nonlinear means being dependent upon the magnitude of voltage across said one section; and means connected to the energy storing means for producing an output control signal in response to the accumulation of a predetermined amount of energy by said energy storing means.

10. The protective means of claim 9 in which said first and second nonlinear means comprise first and second breakdown diodes, respectively, with the first diode and said predetermined first element being selected and arranged so that the first diode is in a relatively low impedance state only when the voltage across said one section is greater than a first predetermined magnitude, and in which said second diode and said predetermined second element are selected and arranged so that the second diode is in a relatively low impedance state only when the voltage across said one section is greater than another predetermined magnitude different than said first predetermined magnitude.

11. The protective means of claim 10 in which the plurality of elements comprising said one section of the energy storing means are resistors.

12. An overcurrent protective device for an electric current circuit, comprising: means adapted to be coupled to the circuit for deriving therefrom a D.-C. voltage representative of circuit current; electric energy storing means connected to the D.-C. voltage deriving means for energization by said D.-C. voltage, said energy storing means including two serially interconnected sections comprising, respectively, a capacitor and a series combination of a plurality of resistors, said energy storing means also including first and second Zener diodes connected, respectively, in parallel circuit relationship with predetermined first and second ones of said plurality of resistors, whereby the conducting status of the respective diodes is dependent upon the magnitude of voltage across the series combination of resistors; and level detecting means connected to said capacitor for producing an output control signal in response to the capacitor being charged to a predetermined voltage level.

13. A device for initiating a predetermined control function in delayed response to the occurrence of an abnormal condition in an electric current circuit, comprising: means adapted to be coupled to the circuit for deriving therefrom a D.-C. signal having a magnitude dependent upon the value of a characteristic electric quantity of the circuit; electric energy storing means disposed for energization under the control of said D.-C. signal, said energy storing means including two serially interconnected sections comprising, respectively, resistance means and reactance means, said energy storing means also including a breakdown diode connected in series circuit relationship with one of said sections and in parallel circuit relationship with a predetermined portion of the other section to prevent voltage across said predetermined portion from exceeding a predetermined maximum magnitude; and level detecting means connected to the energy storing means for initiating the predetermined control function in response to the accumulation of a predetermined amount of energy in said reactance means.

14. In a protective device for an electric current circuit, the combination of: means adapted to be coupled to the circuit for deriving therefrom a D.-C. signal having a magnitude dependent upon the value of a characteristic electric quantity of the circuit; electric energy storing means arranged for energization in accordance with the magnitude of said D.-C. signal, said energy storing means including two interconnected sections comprising, respectively, resistance means and reactance means, said energy storing means also including at least two breakdown diodes connected in circuit, respectively, with different portions of only one of said sections, the conducting status of each of said diodes being dependent upon the magnitude of voltage across said one section; and means connected to the energy storing means for producing an output control signal in response to the accumulation of a predetermined amount of energy in said reactance means.

15. Overcurrent protective means for an electric current circuit, comprising: means adapted to be coupled to the circuit for deriving therefrom a D.-C. signal representative of the circuit current; electric energy storing means including two serially interconnected sections comprising, respectively, a resistance element and a reactance element with one of the sections comprising in series combination at least two elements of like kind, said one section having impedance means, disposed in series circuit relationship with the other section of the energy storing means, in parallel circuit relationship with a predetermined one of its elements, said impedance means being characterized by changeable impedance conditions; said D.-C. signal being supplied to the energy storing means for energizing the interconnected sections thereof and said impedance means being so arranged that its impedance condition is dependent upon the magnitude of said D.-C. signal; and level detecting means connected to said energy storing means for initiating a predetermined control function in response to the accumulation of a predetermined amount of energy by the energy storing means.

16. Overcurrent protective means for an electric current circuit, comprising: means adapted to be coupled to the circuit for deriving therefrom a D.-C. signal representative of circuit current; electric energy storing means including two serially interconnected sections comprising, respectively, a resistance element and a reactance element with one of the sections comprising in parallel combination at least two elements of like kind, said one section having impedance means disposed in series circuit relationship with a predetermined one of its elements, said impedance means being characterized by changeable impedance conditions, said D.-C. signal being supplied to the energy storing means for energizing the interconnected sections thereof and said impedance means being so arranged that its impedance condition is dependent upon the magnitude of said D.-C. signal; and means connected to said energy storing means for initiating a predetermined control function in response to the accumulation of a predetermined amount of energy by the energy storing means.

17. In combination: means adapted to be coupled to an alternating current circuit for deriving therefrom a D.-C. voltage representative of circuit current; electric energy storing means disposed for energization by said D.-C. voltage, said electric energy storing means comprising in series circuit relationship a capacitor having a capacitance of about 0.0001 farad, a first resistor having a resistance of about 20,000 ohms, a second resistor having a resistance of about 22,000 ohms and a third resistor having a resistance of about 84,000 ohms; a first Zener diode, having a breakdown voltage of about 10.0 volts, connected across said second resistor; a second Zener diode, having a breakdown voltage of about 7.3 volts, connected across said third resistor; and means connected to said capacitor for initiating a predetermined control function in response to the capacitor being charged to a predetermined voltage level.

References Cited in the file of this patent

UNITED STATES PATENTS

| 1,877,446 | Curtis | Sept. 13, 1932 |
| 1,960,068 | Ruppell | May 22, 1934 |
| 2,671,874 | Friedricks | Mar. 9, 1954 |